(12) United States Patent
Feller et al.

(10) Patent No.: US 8,445,861 B2
(45) Date of Patent: May 21, 2013

(54) NEUTRON DETECTION BASED ON INDUCED CHARGES

(75) Inventors: W. Bruce Feller, Tolland, CT (US); Paul L. White, Sturbridge, MA (US)

(73) Assignee: Nova Scientific, Inc., Sturbridge, MA (US)

( * ) Notice: Subject to any disclaimer, the term of this patent is extended or adjusted under 35 U.S.C. 154(b) by 400 days.

(21) Appl. No.: 13/016,876

(22) Filed: Jan. 28, 2011

(65) Prior Publication Data

US 2011/0226958 A1 Sep. 22, 2011

Related U.S. Application Data

(60) Provisional application No. 61/299,208, filed on Jan. 28, 2010.

(51) Int. Cl.
*G01T 3/00* (2006.01)

(52) U.S. Cl.
USPC .......................................... 250/391

(58) Field of Classification Search
USPC .......................................... 250/391
See application file for complete search history.

(56) References Cited

U.S. PATENT DOCUMENTS

2010/0001193 A1* 1/2010 Feller et al. .................. 250/366

OTHER PUBLICATIONS

E.H. Eberhardt, ITT Electro-Optical Products Division, Technical Note 127: Parameters Pertaining to Microchannel Plates and Microchannel Plate Devices, pp. 1-17, (Aug. 1980).

* cited by examiner

*Primary Examiner* — David Porta
*Assistant Examiner* — Hugh H Maupin
(74) *Attorney, Agent, or Firm* — Fish & Richardson P.C.

(57) ABSTRACT

Neutrons can be detected using first information derived from a first charge induced on an input electrode of a microchannel plate and second information derived from a second charge induced on an output electrode of the microchannel plate. For example, a ratio between the first charge and the second charge is calculated, a sum of the first and second charges is calculated, and whether a neutron has been detected can be determined based on the ratio and the sum.

38 Claims, 8 Drawing Sheets

NEUTRON DETECTION BASED ON INDUCED CHARGES

CROSS-REFERENCE TO RELATED APPLICATION

This application claims priority to U.S. Provisional Application 61/299,208, filed Jan. 28, 2010, which is incorporated by reference in its entirety.

BACKGROUND

This invention relates to neutron detection.

Neutron-sensitive microchannel plates (MCP) can be used to detect special nuclear materials (SNM), such as plutonium, or can be used in neutron imaging. A microchannel plate can be formed by bonding a glass plate between an input electrode and an output electrode, and providing a high voltage direct current (DC) field between the electrodes. The glass plate is perforated with a substantially regular, parallel array of microscopic channels, for example, cylindrical and hollow channels. Each channel, which can serve as an independent electron multiplier, has an inner wall surface formed of a semi-conductive and electron emissive layer.

The glass plate can be doped with, for example, boron-10, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. The electron cascades develop along the channels and are amplified into detectable signals that are electronically registered and processed to construct a digital image. The resultant intensity map or image corresponds to the variation in neutron flux striking the microchannel plate surface. Contrast differences within the image of a sample can be used to infer physical and chemical properties.

SUMMARY

In one aspect, in general, a method of detecting neutrons includes detecting neutrons using first information derived from a first charge induced on an input electrode of a microchannel plate and second information derived from a second charge induced on an output electrode of the microchannel plate.

Implementations of the method may include one or more of the following features. The method can include calculating a ratio between the first charge and the second charge, calculating a sum of the first and second charges, and determining whether a neutron has been detected based on the ratio and the sum. The method can include calculating a parameter value based on dividing the ratio by the sum, comparing the parameter value with a predetermined range of values, and determining that a neutron has been detected when the parameter value is within the predetermined range of values. The first charge and the second charge can be induced during a time period prior to full development of an avalanche of secondary electrons in the microchannel plate. The time period can have a duration, for example, less than 1 ps, 2 ps, 5 ps, 10 ps, 20 ps, 40 ps, 80 ps, 100 ps, 120 ps, or 160 ps. The first charge and the second charge can be induced during a time period after development of an avalanche of secondary electrons in the microchannel plate. The microchannel plate can include boron-10 or lithium-6.

In another aspect, in general, a method of detecting neutrons includes detecting neutrons using information derived from a first charge induced on an input electrode of a microchannel plate during a first time period, information derived from a second charge induced on an output electrode of the microchannel plate during the first time period, information derived from a third charge induced on the input electrode during a second time period, and information derived from a fourth charge induced on the output electrode during the second time period. The second time period follows the first time period, the second time period being associated with an avalanche of secondary electrons.

Implementations of the method may include one or more of the following features. The start of the first time period and the start of the second time period can be, for example, within 200 ps or 1 second. The first time period can be prior to full development of an avalanche of secondary electrons in the microchannel plate, and the second time period can be after development of the avalanche of secondary electrons in the microchannel plate. The method can include calculating a first ratio between the first charge and the second charge, calculating a first sum of the first and second charges, calculating a second ratio between the third charge and the fourth charge, calculating a second sum of the third and fourth charges, and determining whether a neutron has been detected based on the first ratio, the second ratio, the first sum, and the second sum. The method can include calculating a first parameter value based on dividing the first ratio by the first sum, comparing the first parameter value with a first predetermined range of values, calculating a second parameter value based on dividing the second ratio by the second sum, comparing the second parameter value with a second predetermined range of values, and determining that a neutron has been detected when the first parameter value is within the first predetermined range of values and the second parameter value is within the second predetermined range of values. The microchannel plate can include boron-10 or lithium-6.

In another aspect, in general, a method of detecting neutrons includes detecting a first charge induced on an input electrode of a microchannel plate; detecting a second charge induced on an output electrode of the microchannel plate, the first and second charges being induced by a fully developed electron avalanche, the avalanche being initiated by an interaction between an incident particle and a neutron-sensitive material in the microchannel plate; determining that the incident particle is a neutron based on the first charge and the second charge; and generating a detection signal indicating that a neutron has been detected.

Implementations of the method may include one or more of the following features. Detecting the first and second charges can include detecting the first and second charges on the input and output electrodes, respectively, at substantially the same time. Detecting the first and second charges can include detecting the first and second charges on the input and output electrodes, respectively, in a time period during which an electron avalanche transits through an output end of at least one microchannel of the microchannel plate. The neutron-sensitive material can include at least one of boron-10 or lithium-6. The avalanche can be initiated by moving helium-3, helium-4, lithium-7, protons, or fast electron particles. The method can include comparing characteristics of the detected first and second charges with a first set of predetermined characteristics associated with neutron events, and a second set of predetermined characteristics associated with gamma ray events, and determining that the incident particle is a neutron based on a closer matching between the characteristics of the detected first and second charges and the first set of predetermined characteristics than the second set of characteristics.

In another aspect, in general, a method of detecting neutrons, the method includes discriminating between a neutron and a gamma ray by using first information derived from a first charge induced on a first electrode and second information derived from a second charge induced on a second electrode, the first and second charges being induced by moving charged reaction products generated in an interaction between an incident radiation and a material disposed between the first and second electrodes. The material includes a first component that is sensitive to neutrons and a second component that is sensitive to gamma rays.

Implementations of the method may include one or more of the following features. The material can include an array of microscopic channels. The material can include interconnected fibers. The material can include interconnected microspheres. The material can have a reticulated structure.

In another aspect, in general, a method of detecting neutrons includes detecting induced charges that are generated by moving charged particles, the moving charged particles including reaction products that are generated from an interaction between an incident particle and a neutron-sensitive material in a microchannel plate, the induced charges being induced on at least one electrode of the microchannel plate during a time period prior to full development of an avalanche of secondary electrons in the microchannel plate; determining that the incident particle is a neutron based on information derived from the induced charges; and generating a detection signal indicating that a neutron has been detected.

Implementations of the method may include one or more of the following features. The method can include comparing characteristics of the detected induced charges to information associated with neutron events, in which the determining comprises determining that the incident particle is a neutron based on the comparison. Comparing characteristics of the detected induced charges can include comparing characteristics of the detected induced charges with a first set of predetermined characteristics associated with neutron events and a second set of predetermined characteristics associated with gamma ray events, and determining that the incident particle is a neutron based on a closer matching between the characteristics of the detected induced charges and the first set of predetermined characteristics than the second set of characteristics. The method can include detecting a first charge that is induced on a first electrode of the microchannel plate, and detecting a second charge that is induced on a second electrode of the microchannel plate, in which determining that the incident particle is a neutron can include determining that the incident particle is a neutron based on information derived from the first and second charges. The method can include calculating a ratio between the first charge and the second charge, calculating a sum of the first and second charges, and determining whether a neutron has been detected based on the ratio and the sum. The method can include calculating a parameter value based on dividing the ratio by the sum, comparing the parameter value with a predetermined range of values, and determining that a neutron has been detected when the parameter value is within the predetermined range of values. Detecting induced charges can include detecting induced charges within a timing window shorter than, for example, 1 pico-second, 2 pico-seconds, 5 pico-seconds, 10 pico-seconds, 20 pico-seconds, 40 pico-seconds, 80 pico-seconds, or 160 pico-seconds, the timing window being prior to full development of a cascade of secondary electrons. The neutron-sensitive material can include at least one of boron-10 or lithium-6. Detecting induced charges that are generated by moving charged particles can include detecting induced charges that are generated by at least one of moving helium-3, helium-4, lithium-7, protons, or fast electron particles.

In another aspect, in general, a method of detecting neutrons includes detecting an induced charge signal at an output electrode of a microchannel plate having neutron-sensitive material; and determining whether a neutron has been detected by comparing the amplitude and width of the induced charge signal with stored values. The stored values include a first set of values representing a distribution of pulse amplitude and pulse width values associated with neutron events, and a second set of values representing a distribution of pulse amplitude and pulse width values associated with gamma ray events.

In another aspect, in general, a neutron detector includes a microchannel plate having an input electrode, an output electrode, and a glass plate includes microscopic channels; and a data processor to determine whether a neutron has been detected based on first information derived from a first charge induced on the input electrode and second information derived from a second charge induced on the output electrode.

Implementations of the neutron detector may include one or more of the following features. The neutron detector can include a first amplifier to amplify a first signal associated with the first charge induced on the input electrode, a second amplifier to amplify a second signal associated with a second charge induced on the output electrode, and an analog-to-digital converter to convert amplified first signal to first digital data and convert amplified second signal to second digital data, the data processor determining whether a neutron has been detected based on the first and second digital data. The data processor can be configured to calculate a ratio between the first charge and the second charge, calculate a sum of the first and second charges, and determine whether a neutron has been detected based on the ratio and the sum. The data processor can be configured to calculate a parameter value based on dividing the ratio by the sum, compare the parameter value with a predetermined range of values, and determine that a neutron has been detected when the parameter value is within the predetermined range of values. The first charge and the second charge can be induced during a time period prior to full development of an avalanche of secondary electrons in the microchannel plate. The first charge and the second charge can be induced during a time period after development of an avalanche of secondary electrons in the microchannel plate. The microchannel plate can include boron-10 or lithium-6.

In another aspect, in general, a neutron detector includes a microchannel plate having an input electrode, an output electrode, and a glass plate having microscopic channels. A data processor determines whether a neutron has been detected based on first information derived from a first charge induced on the input electrode during a first time period, second information derived from a second charge induced on the output electrode during the first time period, third information derived from a third charge induced on the input electrode during a second time period, and fourth information derived from a fourth charge induced on the output electrode during the second time period. The second time period follows the first time period, the second time period being associated with an avalanche of secondary electrons.

Implementations of the neutron detector may include one or more of the following features. The start of the first time period and the start of the second time period can be within, for example, 200 ps or 1 second. The first time period can be prior to full development of an avalanche of secondary electrons in the microchannel plate, and the second time period can be after development of the avalanche of secondary electrons in the microchannel plate. The data processor can be configured to calculate a first ratio between the first charge and the second charge, calculate a first sum of the first and second charges, calculate a second ratio between the third charge and the fourth charge, calculate a second sum of the third and fourth charges, and determine whether a neutron has been detected based on the first ratio, the second ratio, the first sum, and the second sum. The data processor can be configured to calculate a first parameter value based on dividing the first ratio by the first sum, compare the first parameter value with a first predetermined range of values, calculate a second parameter value based on dividing the second ratio by the second sum, compare the second parameter value with a second predetermined range of values, and determine that a neutron has been detected when the first parameter value is within the first predetermined range of values and the second parameter value is within the second predetermined range of values. The glass plate can include boron-10 or lithium-6.

In another aspect, in general, a neutron detector includes a first electrode; a second electrode; a material disposed between the first and second electrodes, the material including a neutron sensitive component; and a data processor to determine whether a neutron has been captured in the material based on first information derived from a first charge induced on the first electrode and second information derived from a second charge induced on the second electrode.

Implementations of the neutron detector may include one or more of the following features. The first and second charges can be induced by moving charged reaction products generated in an interaction between an incident radiation and the material. The material can include an array of microscopic channels. The material can include, for example, interconnected fibers or interconnected microspheres. The material can have a reticulated structure.

In another aspect, in general, a neutron detector includes a microchannel plate having an input electrode, an output electrode, and a glass plate comprising microscopic channels; and a data processor to determine whether a neutron has been detected based on comparing the amplitude and width of an induced charge signal detected from the output electrode with stored values. The stored values include a first set of values representing a distribution of pulse amplitude and pulse width values associated with neutron events, and a second set of values representing a distribution of pulse amplitude and pulse width values associated with gamma ray events.

DESCRIPTION

A neutron detector having a microchannel plate can distinguish between neutrons and gamma rays based on characteristics of charges induced on input and output electrodes of the microchannel plate. The microchannel plate has a glass plate having an array of microscopic channels. In some implementations, when an incident neutron or a gamma ray interacts with the glass plate, the interaction produces moving charged particles that induce electric charges in the input and output electrodes. Due to different energy levels of the particles generated from the interactions, the electric charges induced on the input and output electrodes for an incident neutron are different from those for an incident gamma ray. By using information about the charges induced on both the input and output electrodes, one can detect neutrons with high confidence.

Figure 1:
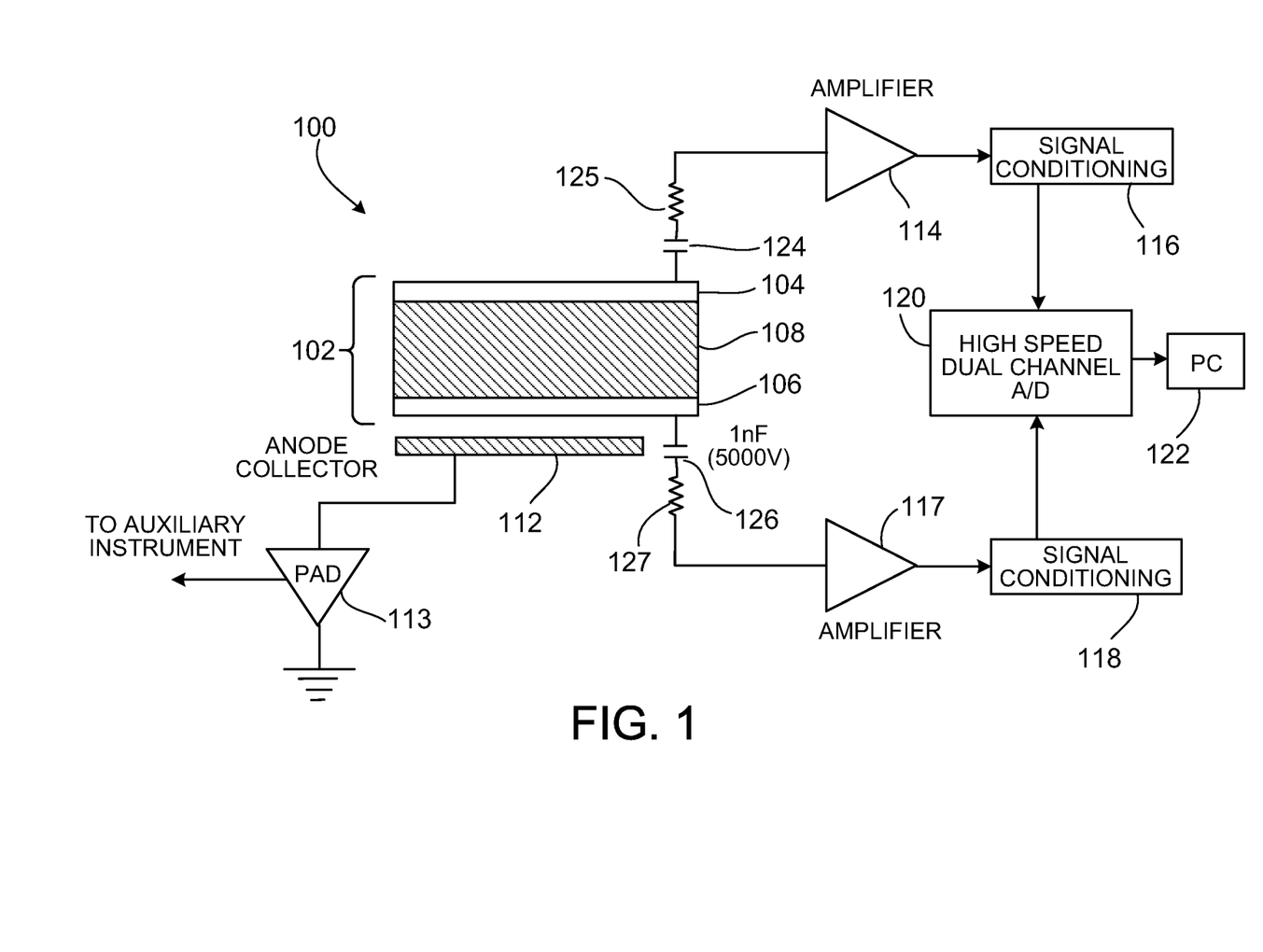
FIG. 1 is a block diagram of a neutron detector.

Referring to FIG. 1, a neutron detector 100 includes a microchannel plate 102 have an input electrode 104, an output electrode 106, and a glass plate 108 positioned between the input and output electrodes 104, 106. The microchannel plate 102 and has an array of microscopic channels each having a diameter of about, for example, 5 to 10 microns (μm). Each channel can have, for example, a circular, square, rectangle, or hexagon cross sectional shape. Each channel serves as an independent electron multiplier and has an inner wall surface formed of a semi-conductive and electron emissive layer. The input and output electrodes 104, 106 can be, for example, metal layers that are coated onto the top and bottom surfaces of the glass plate 108. The input and output electrodes 104, 106 have openings that correspond to the channel openings.

The terms "top" and "bottom" refers to the relative positions of surfaces of the MCP 102 when the MCP 102 is oriented such that the surface of the MCP are horizontal, and incoming radiation enters the microchannels from the top. The MCP 102 can be used in various orientations and in various positions relative to a radiation source such that what we refer to as the "top surface" may actually be positioned below the "bottom surface."

In some implementations, the microchannel plate 102 includes boron-10 ($^{10}$B) doped glass that forms the walls that define the channels. When an incident neutron interacts with a boron-10 atom, an alpha particle (helium-4 or $^4$He) and a lithium-7 ($^7$Li) particle are released, as in the reaction below:

$$n + {}^{10}B \rightarrow {}^{7}Li + {}^{4}He + Q,$$

where Q is the energy released in the reaction. One or both of the lithium-7 and helium-4 particles pass out of the glass and enter one or more adjacent channels, in most cases freeing several (for example, 10 to 100) electrons along the way. For example, other charged particles, such as protons, hydroxide ions (OH$^-$), cesium ions (the glass plate 108 may include cesium oxide) may also be freed by the lithium-7 and helium-4 particles, emerge from the glass walls and enter into the channels.

In some implementations, the input electrode 104 may be connected to a voltage source to have a voltage level of −2000 to −1000 volts, and the output electrode 106 may be connected to a voltage source to have a voltage level of −100 volts. The DC voltage difference between the input and output electrodes 104, 106 generates an electric field (e.g., about 1 kV/mm) that attracts the free electrons toward the output electrode 106. As the electrons strike against the channel walls, more electrons are released, triggering an avalanche of secondary electrons in the microchannels. The electrons pass through the openings in the output electrode 106 and are collected by an anode collector 112, which is connected to the electric ground voltage through a pad 113. The pad 113 may be connected to auxiliary instruments, such as an oscilloscope.

The glass in the microchannel plate 102 may include lead (Pb), which is sensitive to gamma rays. When an incident gamma ray interacts with a lead atom, an energetic electron is released, which passes out of the glass and enter an adjacent channel, in most cases freeing a few electrons (e.g., less than 10) along the way. The one or a few electrons are attracted toward the output electrode 106, and as the electrons strike against the channel walls, more electrons are released, triggering an avalanche of secondary electrons in the microchannels. The electrons pass through the openings in the output electrode 106 and are collected by the anode 112.

The avalanche of secondary electrons in the microchannels can induce charges on the input electrode 104 and the output electrode 106. The charges induced on the input electrode 104 can be amplified by an amplifier 114. A capacitor 124 between the input electrode 104 and the amplifier 114 blocks DC signals while allowing AC signals to pass, decoupling the amplifier from the input electrode 104. A resistor 125 is provided to prevent voltage spikes from damaging the amplifier 114. The output signals from the amplifier 114 can be conditioned by a signal conditioning unit 116. The charges induced on the output electrode 106 can be amplified by an amplifier 117. A capacitor 126 between the output electrode 106 and the amplifier 117 blocks DC signals while allowing AC signals to pass, decoupling the amplifier 117 from the output electrode 106. A resistor 127 is provided to prevent voltage spikes from damaging the amplifier 117. The output signals from the amplifier 117 can be conditioned by a signal conditioning unit 118. For example, the signal conditioning units 116, 118 may introduce delays in one or both of the output signals from the amplifiers 114, 117 to compensate for differences in the signal paths traveled by the signals. After amplification and conditioning, the signals from the input and output electrodes 104, 106 are sent to a high-speed dual channel analog-to-digital converter 120 that samples the analog signals and converts them to digital data. The digital data are stored and processed by a computer 122 (or any other data processing apparatus).

Figures 2, 3:
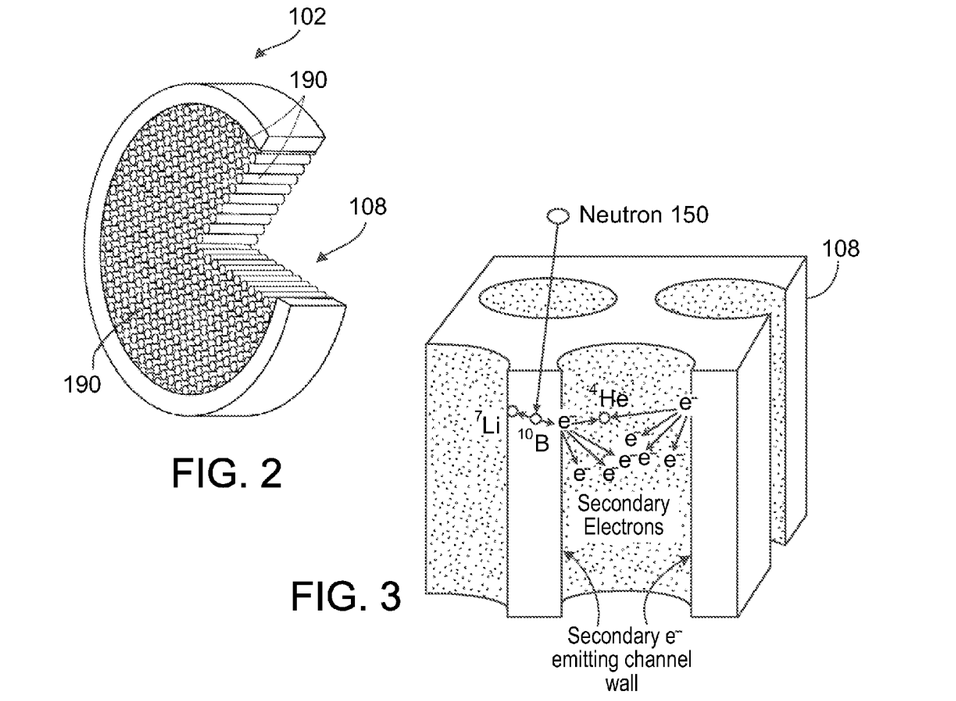
FIG. 2 is a diagram of a glass plate of a microchannel plate.
FIG. 3 is a diagram of neutron capture and conversion in a microchannel plate.
Figure 4:
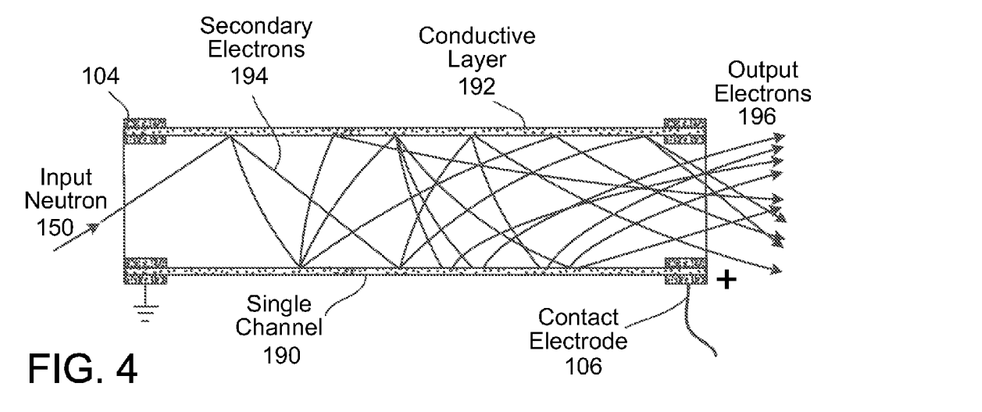
FIG. 4 is a diagram of a microchannel.

FIG. 2 is a diagram of microchannels in the glass plate 108 of the microchannel plate 102. FIG. 3 is a diagram of an interaction between a neutron and a boron-10 atom. FIG. 4 is a diagram showing a development of an avalanche of secondary electrons. Referring to FIGS. 2, 3, and 4, the glass plate 108 has a substantially regular, parallel array of microscopic channels 190. A high DC voltage 110 is applied between the input and output electrodes 104, 106. Each channel 190, which can serve as an independent electron multiplier, has an inner wall surface formed of a semi-conductive and electron emissive layer 192. Each channel 190 further includes (e.g., is formed of) one or more neutron-sensitive compositions, such as compounds that include boron-10.

In operation, when an incident neutron 150 strikes the glass plate 108, the neutron 150 is captured by a boron-10 atom, and an alpha particle ($^4$He) and a lithium-7 ($^7$Li) particle are released. One or both of the lithium-7 and helium-4 particles pass out of the glass and enter one or more adjacent channels 190, freeing electrons along the way. Concurrently, the DC bias voltage 110 is applied between the input and output electrodes 104, 106 such that output electrode 106 has a more positive DC bias voltage than the input electrode 104. The DC bias voltage generates an electric field (e.g., about 1 kV/mm) that attracts free electrons toward the output electrode 106. As free electrons strike the channel walls, more electrons (for example, secondary electrons 194) are released to form a cascade of electrons 196 that exit the bottom surface of the glass plate 108 and is detected as a signal at the output electrode 106. Thus, the glass plate 108 acts as an electron multiplier.

Figure 5:
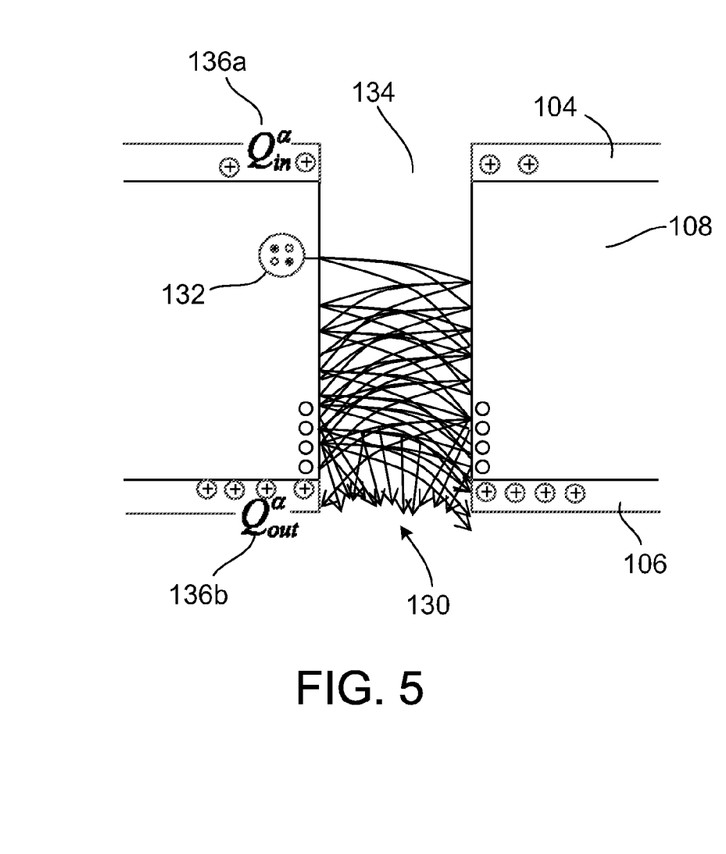
FIGS. 5 and 6 are diagrams of secondary electron avalanche developments.

FIG. 5 is a diagram depicting an avalanche of electrons 130 that results when a helium-4 particle 132 and the accompanying electrons (freed by the helium-4 particle as it propagates in the glass material of the glass plate 108) enter a microchannel 134. A similar avalanche of electrons results when a lithium-7 particle and the accompanying electrons (freed by the lithium-7 particle as it propagates in the glass material of the glass plate 108) enter another microchannel. Due to the avalanche of electrons produced by the lithium-7 and helium-4 particles, charges $Q_{in}^{\alpha}$ 136a are induced on the input electrode 104, and charges $Q_{out}^{\alpha}$ 136b are induced on the output electrode 106. Here, the notations $Q_{in}^{\alpha}$ and $Q_{out}^{\alpha}$ represent charges induced by the helium-4 and lithium-7 particles, and the electrons freed by the helium-4 and lithium-7 particles.

Figure 6:
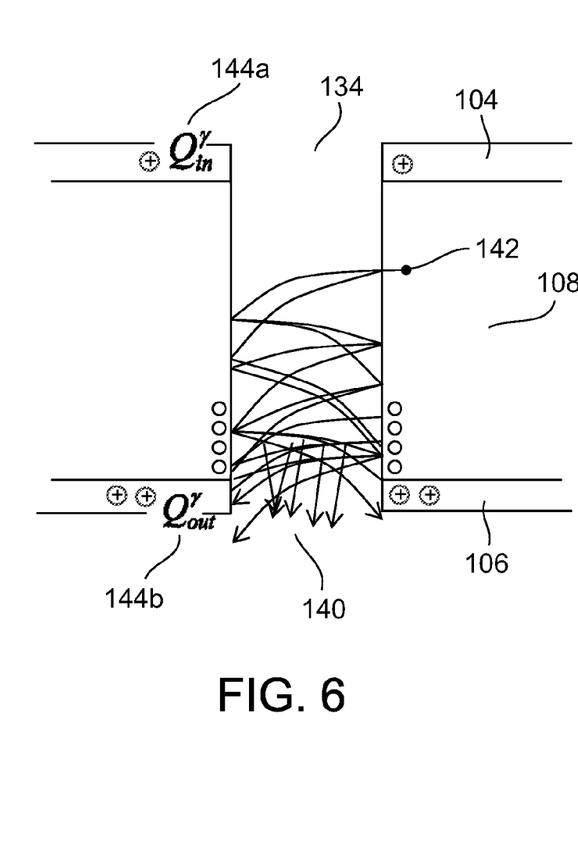

FIG. 6 is a diagram depicting an avalanche of electrons 140 that results when an energetic electron 142 generated from the interaction of a gamma ray and a lead atom, and the accompanying electrons (freed by the electron 142 as it propagates in the glass material of the glass plate 108), enter a microchannel 134. Due to the avalanche of electrons produced by the energetic electron 142, charges $Q_{in}^{\gamma}$ 144a are induced on the input electrode 104, and charges $Q_{out}^{\gamma}$ 144b are induced on the output electrode 106.

A comparison of FIGS. 5 and 6 shows that more electrons are generated from the interaction between a neutron and the boron-10 atom than from the interaction between a gamma ray and a lead atom. As a result, the charges $Q_{in}^{\alpha}$ 136a and $Q_{out}^{\alpha}$ 136b induced on the input and output electrodes 104, 106, respectively, associated with a neutron event are greater than the charges $Q_{in}^{\gamma}$ 144a and $Q_{out}^{\gamma}$ 144b induced on the input and output electrodes 104, 106, respectively, associated with a gamma ray event.

Judging by the amplitude of the induced charges in the input and output electrodes 104, 106 may not be sufficient to accurately determine whether a neutron or a gamma ray has been detected because the total number of secondary electrons depends on the location of the interaction between the neutron and the boron-10 atom, or between the gamma ray and the lead atom. The difference in the induced charges resulting from a neutron interacting with a boron-10 atom located near the output electrode 106 and the induced charges resulting from a gamma ray interacting with a lead atom located near the input electrode 104 may not be sufficiently large to allow accurate determination of whether a neutron or gamma ray is detected.

In some implementations, a neutron verification parameter W1 used for discriminating between neutrons and gamma rays can be calculated using the following formula:

$$W1 = \frac{Q_{in}/Q_{out}}{Q_{in}+Q_{out}}, \qquad \text{(Equation 1)}$$

where Qin represents the charges induced on the input electrode 104 and Qout represents the charges induced on the output electrode 106.

In Equation 1, the charges are normalized to compensate for the variances in the induced charges due to the variations in the locations where the interactions occur. The denominator (Qin+Qout) will be substantially larger for a neutron event than a gamma ray event, so the neutron verification parameter W1 will have a substantially smaller value for a neutron event than for a gamma ray event.

The neutron detector 100 can be calibrated by irradiating the microchannel plate 102 with neutrons generated from a neutron source and calculating the values for the neutron verification parameter W1. The neutron verification parameters W1 may have values that fall within a first range of values. The first range of values are stored in the computer 122 and are associated with neutron events.

The microchannel plate 102 is then irradiated with gamma rays generated from a gamma ray source, and values for the neutron verification parameter W1 are calculated. The neutron verification parameters W1 may have values that fall within a second range of values. The second range of values are stored in the computer 122 and are associated with gamma ray events. It may be possible to adjust the voltage applied to the electrodes 104, 106 to adjust the first range of values and the second range of values, for example, to increase the separation between the first range of values and the second range of values.

When the neutron detector 100 is used to detect radiation from an unknown source, the charges Qin and Qout induced on the input and output electrodes 104, 106, respectively, are measured and the neutron verification parameter W1 is calculated. If the neutron verification parameter W1 is within the first range of values associated with a neutron event, the neutron detector 100 generates a signal indicating that a neutron has been detected. If the neutron verification parameter W1 is within the second range of values associated with a gamma ray event, the neutron detector 100 determines that a gamma ray has been detected.

In some implementations, charges induced on the input and output electrodes 104, 106 due to movements of the charges prior to the development of avalanche of secondary electrons can also be used to discriminate between a neutron event and a gamma ray event.

Figure 7A:
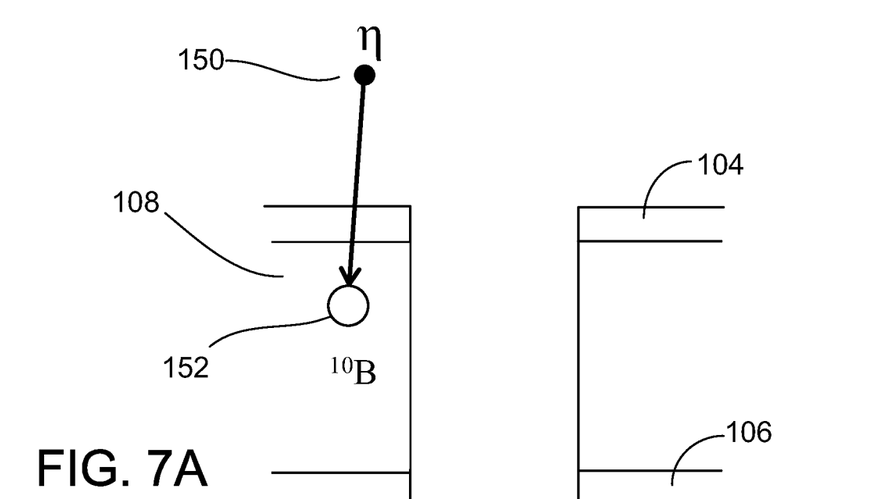
FIGS. 7A to 7C are diagrams showing an interaction between an incident neutron and a boron-10 atom.

FIG. 7A shows an incident neutron 150 interacting with a boron-10 atom 152 in the glass plate 108. The interaction results in a helium-4 particle 154 (FIG. 7B) and a lithium-7 particle, both having positive charges, that travel in opposite directions at high speeds.

Figure 7B:
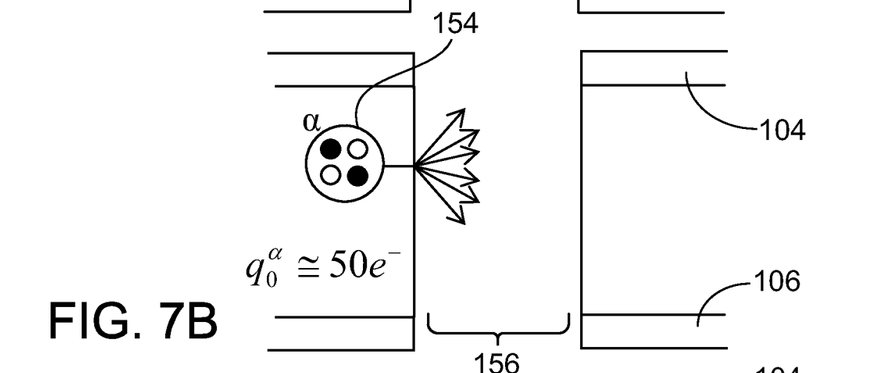

FIG. 7B shows an alpha particle 154 that propagates through the glass material of the glass plate 108, knocking off electrons from other atoms along the way. By the time the alpha particle 154 emerges from the glass material and enters a channel 156, several free electrons 158 and other charged particles such as protons or cesium ions are generated, which also enter the channel 156. Similarly, the lithium-7 particle propagates through the glass material and frees electrons and other charged particles along the way, resulting in the lithium-7 particle and additional free electrons and other charged particles entering another channel.

Figure 7C:
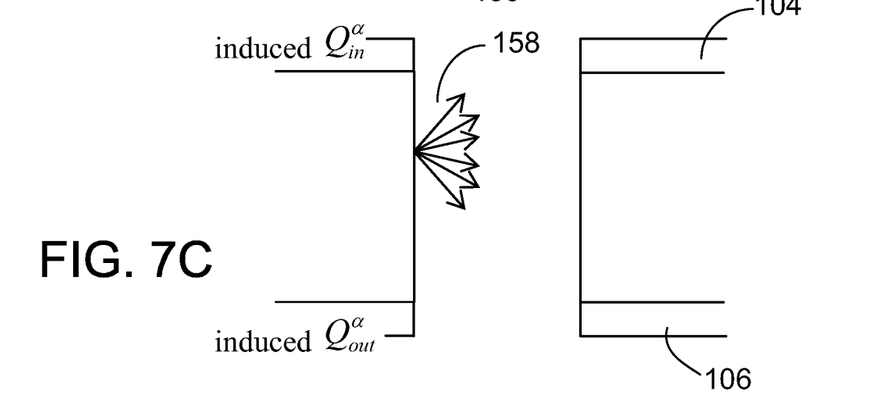

Referring to FIG. 7C, when charged particles 158 (for example, the alpha particle 154 and free electrons) propagate at high speeds in the glass material and in the microchannel 156, charges are induced on the input and output electrodes 104, 106. In this example, the charges on the input and output electrodes 104, 106 are induced by the moving particles in the glass material and microchannels during a short period of time prior to the avalanche of secondary electrons. The transient and ultrafast movements of the initiating charged particles (for example, helium-4 and free electrons) cause corresponding variations of an induced charge Q on one or both electrodes 104, 106. The induced charge Q is converted to a voltage pulse using an ultrafast charge sensing amplifier.

Without being limited by any theory presented herein, the basis of this method can be explained by the Shockley-Ramo theorem, which relates the induced charge Q and current i on an electrode induced by a moving point charge q. It has the consequence that the induced charge Q on one or both electrodes 104, 106, as produced by the moving charge q, depends only on the location of the moving charge q and the configuration of the MCP, and is independent of applied bias voltages and any other charge distributions.

Specifically, the transient and ultrafast movements of the initiating charged particles induce a charge $Q'_{in}{}^{\alpha}$ on the input electrode 104 and a charge $Q'_{out}{}^{\alpha}$ on the output electrode 106. Here, the notations $Q'_{in}{}^{\alpha}$ and $Q'_{out}{}^{\alpha}$ represent charges induced by the helium-4 and lithium-7 particles, and the electrons freed by the helium-4 and lithium-7 particles. The charges $Q'_{in}{}^{\alpha}$ and $Q'_{out}{}^{\alpha}$ can be measured within a short timing window having a duration, for example, from 1 pico-second (ps) to 100 ps. The timing window is selected to be prior to the subsequent secondary electron avalanche development. Depending on the configuration of the microchannel plate 102, the timing window can have various durations, such as 2 ps, 5 ps, 10 ps, 20 ps, 40 ps, 80 ps, 100 ps, 120 ps, 160 ps, or some other duration.

The secondary electron avalanche may require more than 100 ps to fully develop and transit down through the microchannel, accumulating an exponential increase in charge until it exits the bottom of the microchannel. As the full charge cloud passes the output of the channel to land on the metal collecting anode 112, the charge cloud induces a strong positive-going signal pulse on the output electrode 106.

Figure 8A:
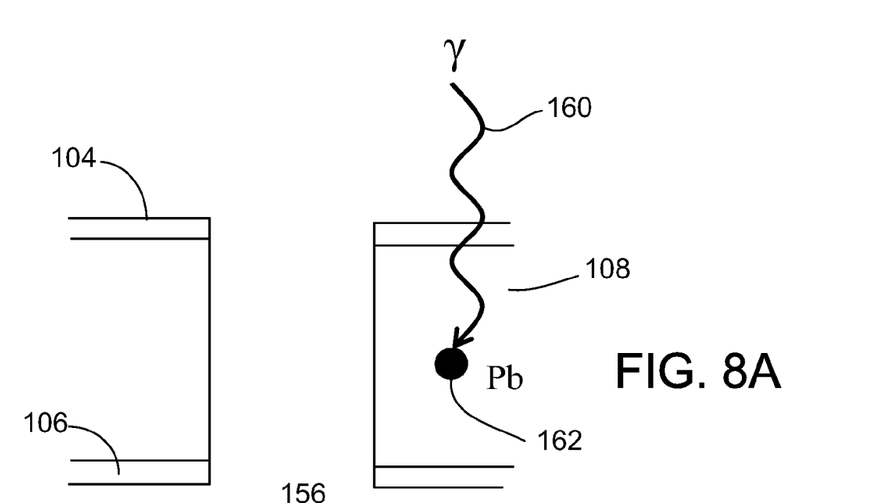
FIGS. 8A to 8C are diagrams showing an interaction between an incident gamma ray and a lead atom.

FIG. 8A shows an incident gamma ray 160 interacting with a lead atom 162 in the glass plate 108. The interaction produces an energetic electron 164 (FIG. 8B).

Figure 8B:
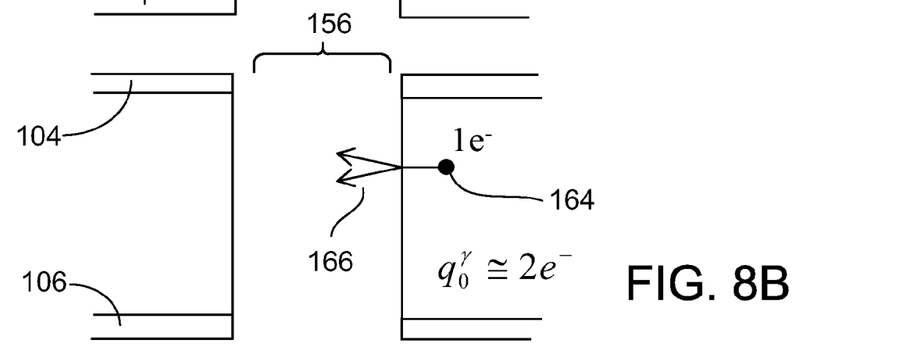

FIG. 8B shows the free electron 164 propagating through the glass material of the glass plate 108, freeing another electron along the way, resulting in up to about two electrons 166 entering a channel 156.

Figure 8C:
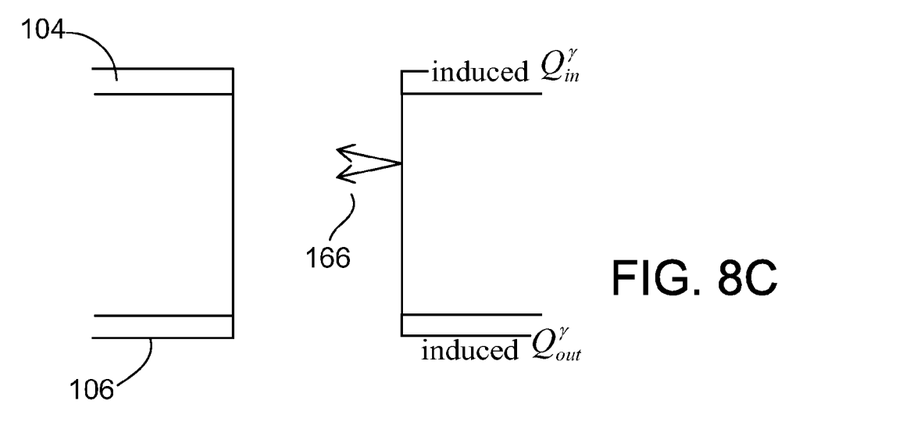

Referring to FIG. 8C, when the electrons 166 propagate at high speeds in the glass material and in the microchannel, charges are induced on the input and output electrodes 104, 106. Here, the charges on the input and output electrodes 104, 106 are induced by the high speed free electrons moving in the glass material and microchannel during a short period of time prior to the avalanche of secondary electrons. The electrons 166 induce a charge $Q'_{in}{}^{\gamma}$ on the input electrode 104 and a charge $Q'_{out}{}^{\gamma}$ on the output electrode 106. The charges $Q'_{in}{}^{\gamma}$ and $Q'_{out}{}^{\gamma}$ can be measured within a short timing window having a duration, for example, from 1 pico-second (ps) to 100 ps. The timing window is selected to be prior to the subsequent electron avalanche development.

The charges $Q'_{in}{}^{\gamma}$ and $Q'_{out}{}^{\gamma}$ on the input and output electrodes 104, 106, respectively, depend on the location of the moving charges (for example, helium-4, lithium-7, and/or free electrons), and are independent of the bias voltage 110 and stationary space charges in the microchannel plate 102. The induced charges $Q'_{in}$ and $Q'_{out}$ can be amplified, digitized, and analyzed.

A comparison of FIGS. 7C and 8C shows that more moving electrons are generated from the interaction between the neutron 150 and the boron-10 atom 152 than from the interaction between the gamma ray 160 and the lead atom 162. As a result, the charges $Q'_{in}{}^{\alpha}$ and $Q'_{out}{}^{\alpha}$ induced on the input and output electrodes 104, 106, respectively, associated with a neutron event are greater than the charges $Q'_{in}{}^{\gamma}$ and $Q'_{out}{}^{\gamma}$ induced on the input and output electrodes 104, 106, respectively, associated with a gamma ray event.

In some implementations, a neutron verification parameter W2 used for discriminating between neutrons and gamma rays can be calculated using the following formula:

$$W2 = \frac{Q'_{in}/Q'_{out}}{Q'_{in}+Q'_{out}}, \qquad \text{(Equ. 2)}$$

where $Q'_{in}$ represents the charges induced on the input electrode 104 and $Q'_{out}$ represents the charges induced on the output electrode 106 due to the moving charges (for example, helium-4, lithium-7, and or free electrons) in the glass material or microchannel.

In Equ. 2, similar to Equ. 1, the charges are normalized to compensate for the variances in the induced charges due to the variations in the locations where the interactions occur. The denominator ($Q'_{in}+Q'_{out}$) will be substantially larger for a neutron event than a gamma ray event, so the neutron verification parameter W2 will have a substantially smaller value for a neutron event than a gamma ray event.

Figure 9:
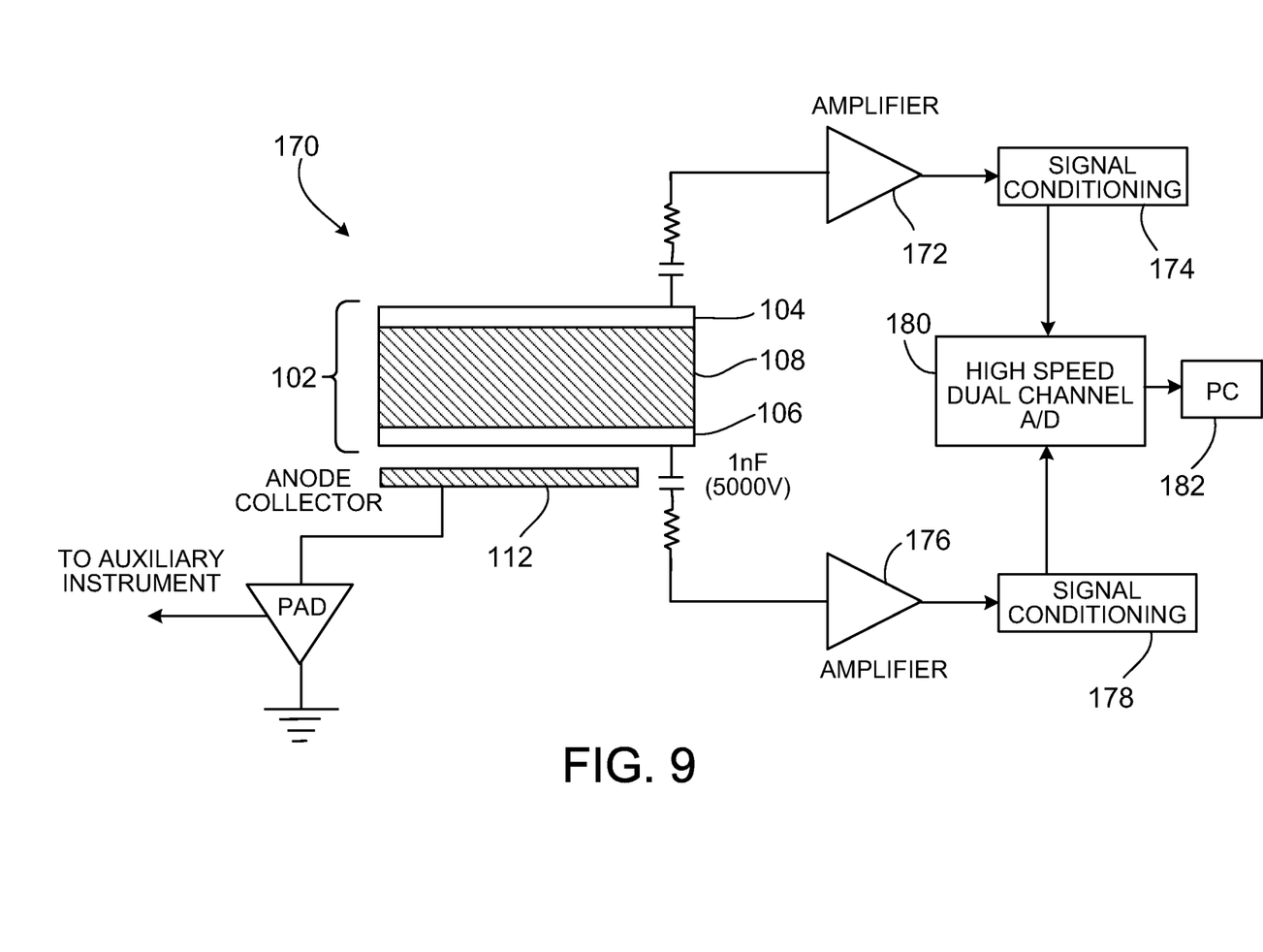
FIG. 9 is a block diagram of a neutron detector.

Referring to FIG. 9, a neutron detector 170 can detect neutrons using information about charges induced on the input and output electrodes of a microchannel plate due to movements of the charges prior to development of an avalanche of secondary electrons. In some implementations, the neutron detector 170 includes a microchannel plate 102 that has an input electrode 104, an output electrode 106, and a glass plate 108 having an array of microscopic channels. An amplifier 172 amplifies the signals read out from the input electrode 104, and a signal conditioning unit 174 conditions the signals output from the amplifier 172. An amplifier 176 amplifies the signals read out from the output electrode 106, and a signal conditioning unit 178 conditions the signals output from the amplifier 176. A high-speed dual channel analog-to-digital converter 180 samples the analog signals output from the signal conditioning units 174, 178, and converts the analog signals to digital data. A computer 182 stores and processes the digital data.

The neutron detector 170 can be similar to the neutron detector 100 of FIG. 1. However, because the charges induced on the electrodes prior to the development of second electron avalanche is smaller than the charges induced after the avalanche, the amplifiers 172, 176, signal conditioning units 174, 178, and the high-speed dual channel analog-to-digital converter 180 may require higher speeds, higher sensitivities, and lower noise levels than corresponding components used in the neutron detector 100.

The neutron detector 170 can be calibrated by irradiating the microchannel plate 102 with neutrons generated from a neutron source and calculating the values for the neutron verification parameter W2. The neutron verification parameters W2 may have values that fall within a first range of values. The first range of values are stored in the computer 182 and are associated with neutron events.

The microchannel plate 102 is irradiated with gamma rays generated from a gamma ray source and values for the neutron verification parameter W2 are calculated. The neutron verification parameters W2 may have values that fall within a second range of values. The second range of values are stored in the computer 182 and are associated with gamma ray events. It may be possible to adjust the voltage applied to the electrodes 104, 106 to adjust the first range of values and the second range of values, for example, to increase the separation between the first range of values and the second range of values.

When the neutron detector 170 is used to detect radiation from an unknown source, the charges and $Q'_{in}$ and $Q'_{out}$ induced on the input and output electrodes 104, 106, respectively, are measured and the neutron verification parameter W2 is calculated. If W2 is within the first range of values associated with a neutron event, the neutron detector 170 generates a signal indicating that a neutron has been detected. If W2 is within the second range of values associated with a gamma ray event, the neutron detector 170 determines that a gamma ray has been detected.

In some implementations, when the neutron detector 170 is used, both neutron verification parameters W1 and W2 are calculated for determining detection of neutrons with high confidence. For example, when a first signal pulse from the input electrode 104 and a second signal pulse from the output electrode 106 are detected, the computer 182 examines the signal pulses within a short timing window (for example, having a duration from 1 ps to 100 ps) and calculates the neutron parameter W2. The computer 182 then examines the signal pulses after the short timing window during a time duration associated with the development of a secondary electron avalanche and calculates the neutron parameter W1. The neutron verification parameters W1 and W2 are compared to pre-stored ranges of parameter values associated with neutron events and gamma ray events. If both W1 and W2 parameters indicate a neutron event, the neutron detector 180 generates a signal indicated that a neutron is detected.

Figure 10A:
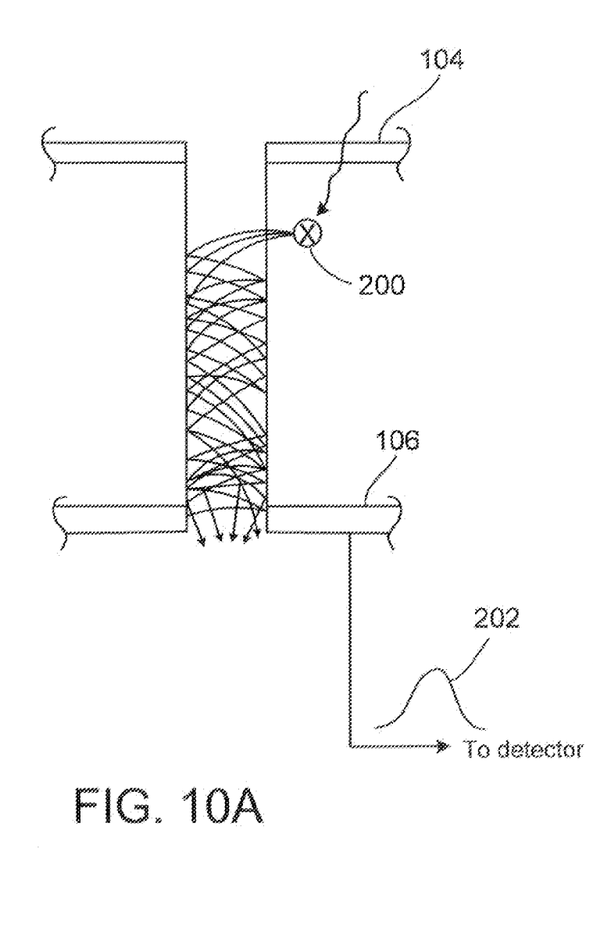
FIGS. 10A and 10B are diagrams showing interactions between an incident neutron or gamma ray and a particle in the microchannel plate.
Figure 10B:
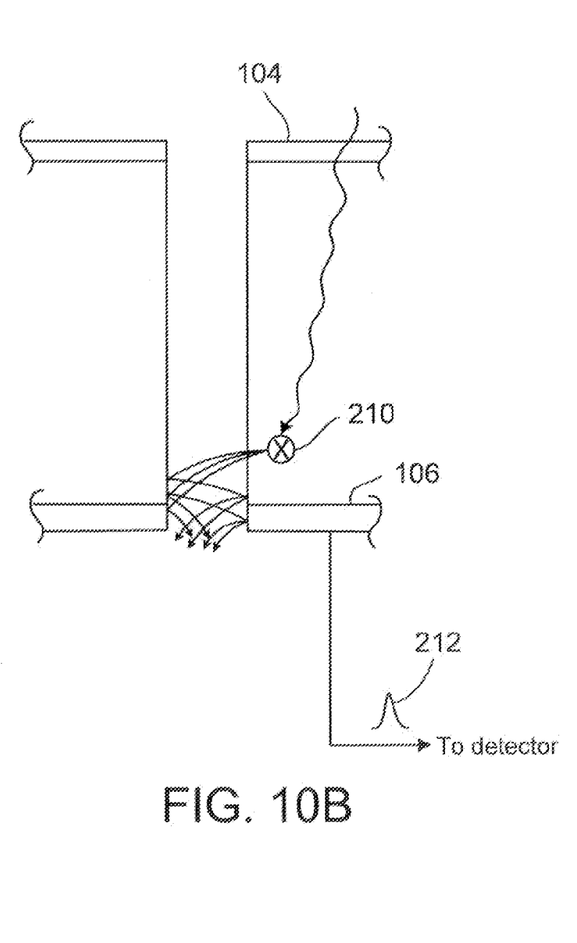

Referring to FIGS. 10A and 10B, depending upon the point of event initiation (where a neutron or gamma ray interacts with a particle in the microchannel plate), the width of the induced charge signal obtained from the output electrode may be different. For example, as shown in FIG. 10A, when a neutron or gamma ray interacts with a particle 200 that is closer to the input electrode 104, the induced charge signal 202 detected at the output electrode 106 will be wider. By comparison, as shown in FIG. 10B, when a neutron or gamma ray interacts with a particle 210 that is closer to the output electrode 106, the induced charge signal 212 detected at the output electrode 106 will be narrower.

The pulse width can be compare with the pulse amplitude for assisting in determining whether a neutron or gamma ray has been detected. For example, neutron pulses may differ from gamma ray pulses, and the two types of pulses may fall into different zones of an x-y plot, in which the x-axis represents the pulse width or rise-time, and the y-axis represents the pulse amplitude.

Without being limited by any theory presented herein, the basis of the different in pulse widths for neutron and gamma events can be explained as follows. The developing avalanche or pulse proceeds down the microchannel with a transit time t, and a transit time spread dt, which is a statistical spreading arising from the convolution of multiple statistical distributions of secondary electron emission angle, energy, and number. For example, the transit time spread dt for a 12 micron pore, 40:1 L/D MCP operated at 800V is about 60 ps based on the FWHM of a time-of-flight analysis, with the corresponding overall avalanche transit time of about 190 ps. Other secondary factors may also cause the pulse to broaden further (e.g., up to 2×), where the above values represent the idealized t and dt values. As a rough estimate, induced pulse widths at the output electrode 106 for a 10 or 12 micron pore, 40:1 MCP at typical operating voltages, may be on the order of about 100 ps, and for 80:1 MCPs, on the order of about 200 ps based on the direct proportionality of dt with channel length L, where $$dt=\sqrt{(2m/e)}L/V^{1/2},$$

where L represents the channel length. The linear proportionality of dt with channel length L implies that in MCP bulk detection mode—which applies for both neutrons and gamma rays—the pulse time spread dt depends on the point of interaction down into the depth of the microchannel. A gamma ray interacting and creating a fast photoelectron near the top of the MCP will result in a larger pulse time spread by the time the developed avalanche passes through the bottom or output end of the channel and exits, were it induces a pulse onto the bottom MCP electrode (e.g., the output electrode 106). Conversely, a gamma ray interacting near the bottom of the channel, will have fewer wall collisions prior to exiting the channel output end (and thus a much smaller built-up pulse amplitude), smaller transit time t, and less pulse broadening dt.

It may be difficult to directly measure the pulse transit time t in a microchannel. However, the transit time spread dt can be measured (as it is included in the pulse width), as can pulse rise time t and pulse amplitude Q. The rise time t can be measured using a zero crossover timing technique, by first passing the pulse signal through a double differentiator (e.g., CR-RC-CR network or double delay line shaper), and then using time-to-amplitude conversion (TAC) to convert the zero crossover time into an amplitude that can be plotted. There will be two separate and distinct pulse height distributions for neutrons versus gamma rays, relating rise time t and pulse amplitude Q. Pulse amplitude and width can be measured on either analog or digital oscilloscopes, using standard techniques. To measure pulse signals having about 100 ps pulse-widths, either a very fast high speed analog oscilloscope (for example, 400 MHz) for analog measurement, or a 10 GS/s digital oscilloscope for digital measurement may be used.

Figure 11:
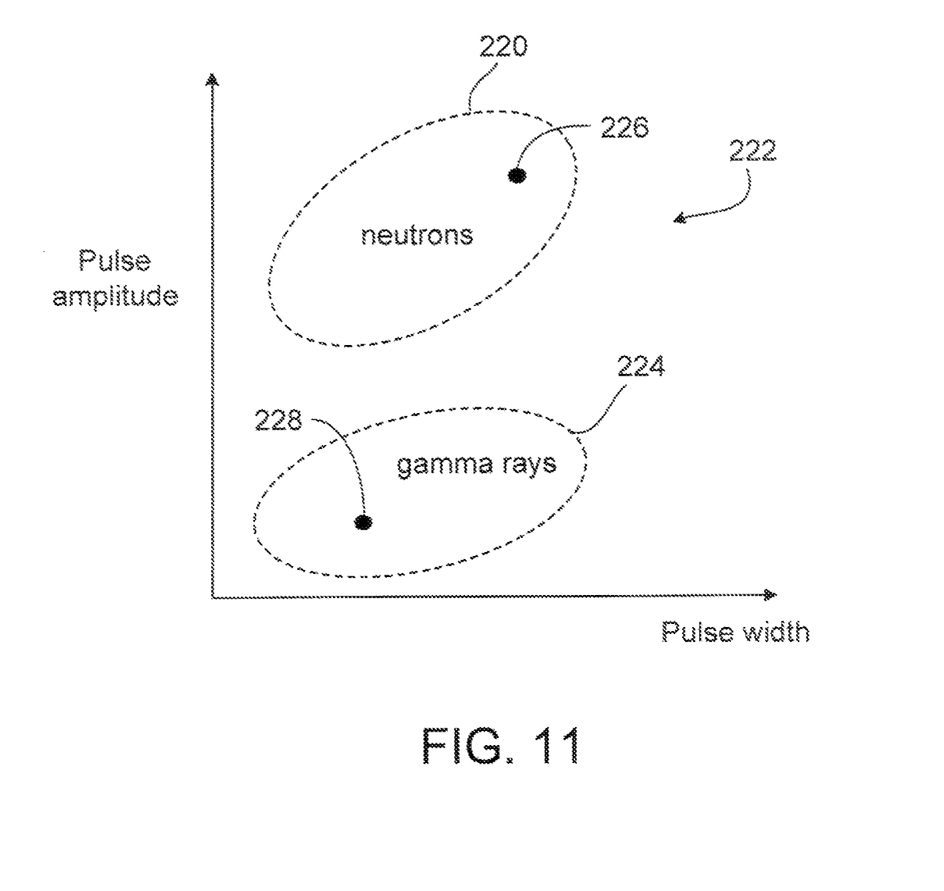
FIG. 11 is a graph showing a region representing data values associated with neutron events and another region representing data values associated with gamma ray events.

Referring to FIG. 11, the neutron detector 100 can be calibrated by irradiating the microchannel plate 102 with neutrons generated from a neutron source, detecting induced charge signals from the output electrode 104, and measuring the amplitude and width of each induced charge signal. The amplitudes and widths of the induced charge signals may have values that fall within a first range of values, represented as region 220 in a pulse amplitude versus pulse width plot 222. The first range of values for the pulse widths and amplitudes are stored in the computer 122 and are associated with neutron events.

The microchannel plate 102 is then irradiated with gamma rays generated from a gamma ray source. Induced charge signals from the output electrode 104 are detected, and the amplitude and width of each induced charge signal are calculated. The amplitudes and widths of the induced charge signals may have values that fall within a second range of values, represented as region 224 in the pulse amplitude versus pulse width plot 222. The second range of values for the pulse widths and amplitudes are stored in the computer 122 and are associated with gamma ray events. It may be possible to adjust the voltage applied to the electrodes 104, 106 to adjust the first range of values and the second range of values, for example, to increase the separation between the region 220 and the region 224.

When the neutron detector is used to detect radiation from an unknown source, the amplitudes and widths of the induced charge signals obtained from the output electrode 106 are measured and compared against the stored values. If the amplitude and width of an induced charge signal, represented by data point 226, are within the first range of values (e.g., region 220) associated with a neutron event, the neutron detector generates a signal indicating that a neutron has been detected. If the amplitude and width of an induced charge signal, represented by data point 228, are within the second range of values (e.g., region 224) associated with a gamma ray event, the neutron detector determines that a gamma ray has been detected.

In some implementations, the pulse width and amplitude information can be used in combination with the neutron verification parameter(s) W1 and/or W2 to increase the accuracy of neutron detection.

It is to be understood that the foregoing description is intended to illustrate and not to limit the scope of the neutron detection devices described herein. For example, instead of a microchannel plate, a microsphere plate, a microfiber plate, or a microreticulated plate can be used. A microfiber plate may include several randomly interconnected fibers having electron-emissive surfaces disposed between an input electrode and an output electrode, as described in U.S. Pat. No. 6,828,714, which is incorporated herein by reference. A microsphere plate may include a several interconnected to spheres having electron-emissive surfaces disposed between an input electrode and an output electrode. A microreticulated plate may include a reticulated structure having electron-emissive surfaces disposed between an input electrode and an output electrode, as described in U.S. Pat. No. 7,183,701, which is incorporated herein by reference. The charges from the input and output electrodes of the microsphere plate, microfiber plate, or microreticulated plate can be used to calculate the neutron verification parameters W1 and/or W2 for use in determining whether a neutron has been detected.

For a neutron detector that verifies whether a neutron has been detected based on charges induced on the input and output electrodes prior to the development of the avalanche of secondary electrons, it is possible to position a neutron sensitive material between two electrodes, detect and analyze signals representing the induced charges using the amplifiers 172, 176, the signal conditioning units 174, 178, the high speed dual channel analog-to-digital converter 180, and computer 182 to verify whether a neutron or gamma ray has been detected. The neutron sensitive material does not need to have a particular shape.

The dimensions and shapes of the microchannels can be different from those described above. Boron-10 may exist in oxide form or in other form. The glass plate 108 of the microchannel plate 102, instead of being doped with boron-10, can be doped with lithium-6, which can capture neutrons as shown in the following reaction:

$$Li+{}^1n \rightarrow {}^3H+{}^4He+Q(4.78\ MeV);$$

In the case of lithium-6, the neutron capture reaction generates alpha particles (helium-4 ions) and triton particles (helium-3 ions) that can cause secondary electron emissions in the microchannels 190. The glass plate 108 can also be doped with a combination of boron-10 and lithium-6. Other neutron sensitive materials can also be used. For example, the microchannel plate can include hydrogen-containing material in which energetic protons are released and secondary electrons are produced within the microchannel plate when neutrons strike the hydrogen-containing material. The hydrogen-containing material can include, for example, a polymer that includes hydrogen atoms. The hydrogen-containing material can include, for example, a high-density polyethylene, nylon, or polyaramid. Such materials are described in, for example, U.S. Patent Application Publication 2009-0179542-A1, filed on Feb. 5, 2007, which is incorporated herein by reference.

In some implementations, the microchannel plate can have a glass plate made of low-Z glass without lead or other high mass components (materials having atomic numbers larger than 34). A thin layer of neutron-absorbing material, a thin layer of semiconducting material, and a thin layer of electron emissive material can be formed on the surfaces of the microchannels using, for example, atomic layer deposition. When an incident neutron interacts with neutron-absorbing material, the interaction produces moving charged particles that interact with the electron emissive material, which in turn emits electrons that are attracted toward the end of the microchannel having a higher electric potential. As the electrons strike against the channel walls, more electrons are released from the electron emissive layer. By using a glass plate without lead or other high mass components, there will be a lower probability of false detection of neutrons due to reactions between ambient gamma rays and lead or other high mass components.

To fabricate the microchannel plate, atomic layer deposition thin film techniques are used to modify the surfaces of the microscopic channels by forming a sequence of functional layers that conformally coat the surfaces of the microchannels. For example, a neutron-absorbing layer of boron-10 compound, such as boron-10 oxide ($^{10}B_2O_3$), boron-10 nitride ($^{10}BN$), or other material, having a thickness of about 1 μm, can be formed on the surface of the microchannels by atomic layer deposition and serves as heavy charged particle and prompt gamma ray-emitting medium. The boron-10 enriched layer can have a thickness within a range of, for example, approximately 0.5 μm to 5 μm. A resistive (semiconducting) coating can be deposited by atomic layer deposition on top of the neutron-absorbing layer to establish an electric field gradient and simultaneously allow a small leakage or bias current to flow through the microchannel surface, neutralizing the positive surface charge due to emission of secondary electrons that form the detectable electron amplification pulse following an electron avalanche. For example, the semiconducting layer can include a $AlZn_xO_y$ alloy film. The semiconducting layer 106 can have a thickness in a range from, for example, 50 to 1000 nm. A thin layer of material having a high secondary electron yield coefficient (SEC) can be deposited by atomic layer deposition on top of the semiconducting coating to enhance the overall gain. For example, the electron emissive layer can include aluminum oxide ($Al_2O_3$) or magnesium oxide (MgO). The electron emissive layer can have a thickness in a range from, for example, 3 to 12 nm, or preferably 5 to 10 nm. Other materials can also be used for the neutron-absorbing layer, semiconducting layer, and the electron emissive layer.

Elements of different embodiments described above may be combined to form embodiments not specifically described herein. Other implementations not specifically described herein are also within the scope of the following claims.

What is claimed is:

1. A method of detecting neutrons, the method comprising: detecting neutrons using first information derived from a first charge induced on an input electrode of a microchannel plate and second information derived from a second charge induced on an output electrode of the microchannel plate.

2. The method of claim 1, comprising calculating a ratio between the first charge and the second charge, calculating a sum of the first and second charges, and determining whether a neutron has been detected based on the ratio and the sum.

3. The method of claim 2, comprising calculating a parameter value based on dividing the ratio by the sum, comparing the parameter value with a predetermined range of values, and determining that a neutron has been detected when the parameter value is within the predetermined range of values.

4. The method of claim 1 in which the first charge and the second charge are induced during a time period prior to full development of an avalanche of secondary electrons in the microchannel plate.

5. The method of claim 1 in which the first charge and the second charge are induced during a time period after development of an avalanche of secondary electrons in the microchannel plate.

6. The method of claim 1 in which the microchannel plate comprises at least one of boron-10 or lithium-6.

7. A method of detecting neutrons, the method comprising: detecting neutrons using information derived from a first charge induced on an input electrode of a microchannel plate during a first time period, information derived from a second charge induced on an output electrode of the microchannel plate during the first time period, information derived from a third charge induced on the input electrode during a second time period, and information derived from a fourth charge induced on the output electrode during the second time period, the second time period following the first time period, the second time period being associated with an avalanche of secondary electrons.

8. The method of claim 7 in which the first time period is prior to full development of an avalanche of secondary electrons in the microchannel plate, and the second time period is after development of the avalanche of secondary electrons in the microchannel plate.

9. The method of claim 7, comprising calculating a first ratio between the first charge and the second charge, calculating a first sum of the first and second charges, calculating a second ratio between the third charge and the fourth charge, calculating a second sum of the third and fourth charges, and determining whether a neutron has been detected based on the first ratio, the second ratio, the first sum, and the second sum.

10. The method of claim 9, comprising calculating a first parameter value based on dividing the first ratio by the first sum, comparing the first parameter value with a first predetermined range of values, calculating a second parameter value based on dividing the second ratio by the second sum, comparing the second parameter value with a second predetermined range of values, and determining that a neutron has been detected when the first parameter value is within the first predetermined range of values and the second parameter value is within the second predetermined range of values.

11. The method of claim 7 in which the microchannel plate comprises at least one of boron-10 or lithium-6.

12. A method of detecting neutrons, the method comprising:
detecting a first charge induced on an input electrode of a microchannel plate;
detecting a second charge induced on an output electrode of the microchannel plate, the first and second charges being induced by a fully developed electron avalanche, the avalanche being initiated by an interaction between an incident particle and a neutron-sensitive material in the microchannel plate;
determining that the incident particle is a neutron based on the first charge and the second charge; and
generating a detection signal indicating that a neutron has been detected.

13. The method of claim 12, in which detecting the first and second charges comprises detecting the first and second charges on the input and output electrodes, respectively, at substantially the same time.

14. The method of claim 12, in which detecting the first and second charges comprises detecting the first and second charges on the input and output electrodes, respectively, in a time period during which an electron avalanche transits through an output end of at least one microchannel of the microchannel plate.

15. The method of claim 12 in which the neutron-sensitive material comprises at least one of boron-10 or lithium-6.

16. The method of claim 12 in which the avalanche is initiated by at least one of moving helium-3, helium-4, lithium-7, protons, or fast electron particles.

17. The method of claim 12, comprising comparing characteristics of the detected first and second charges with a first set of predetermined characteristics associated with neutron events, and a second set of predetermined characteristics associated with gamma ray events, and determining that the incident particle is a neutron based on a closer matching between the characteristics of the detected first and second charges and the first set of predetermined characteristics than the second set of characteristics.

18. A method of detecting neutrons, the method comprising:
discriminating between a neutron and a gamma ray by using first information derived from a first charge induced on a first electrode and second information derived from a second charge induced on a second electrode, the first and second charges being induced by moving charged reaction products generated in an interaction between an incident radiation and a material disposed between the first and second electrodes, the material comprising a first component that is sensitive to neutrons and a second component that is sensitive to gamma rays.

19. The method of claim 18 in which the material comprises at least one of an array of microscopic channels, interconnected fibers, or interconnected microspheres.

20. The method of claim 18 in which the material has a reticulated structure.

21. A method of detecting neutrons, the method comprising:
detecting an induced charge signal at an output electrode of a microchannel plate having neutron-sensitive material; and
determining whether a neutron has been detected by comparing the amplitude and width of the induced charge signal with stored values, in which the stored values include a first set of values representing a distribution of pulse amplitude and pulse width values associated with neutron events, and a second set of values representing a distribution of pulse amplitude and pulse width values associated with gamma ray events.

22. A neutron detector comprising:
a microchannel plate having an input electrode, an output electrode, and a glass plate comprising microscopic channels; and
a data processor to determine whether a neutron has been detected based on first information derived from a first charge induced on the input electrode and second information derived from a second charge induced on the output electrode.

23. The neutron detector of claim 22, further comprising a first amplifier to amplify a first signal associated with the first charge induced on the input electrode,
a second amplifier to amplify a second signal associated with a second charge induced on the output electrode, and
an analog-to-digital converter to convert amplified first signal to first digital data and convert amplified second signal to second digital data, the data processor determining whether a neutron has been detected based on the first and second digital data.

24. The neutron detector of claim 22 in which the data processor is configured to calculate a ratio between the first charge and the second charge, calculate a sum of the first and second charges, and determine whether a neutron has been detected based on the ratio and the sum.

25. The neutron detector of claim 24 in which the data processor is configured to calculate a parameter value based on dividing the ratio by the sum, compare the parameter value with a predetermined range of values, and determine that a neutron has been detected when the parameter value is within the predetermined range of values.

26. The neutron detector of claim 22 in which the first charge and the second charge are induced during a time period prior to full development of an avalanche of secondary electrons in the microchannel plate.

27. The neutron detector of claim 22 in which the first charge and the second charge are induced during a time period after development of an avalanche of secondary electrons in the microchannel plate.

28. The neutron detector of claim 22 in which the microchannel plate comprises at least one of boron-10 or lithium-6.

29. A neutron detector comprising:
a microchannel plate having an input electrode, an output electrode, and a glass plate comprising microscopic channels; and
a data processor to determine whether a neutron has been detected based on first information derived from a first charge induced on the input electrode during a first time period, second information derived from a second charge induced on the output electrode during the first time period, third information derived from a third charge induced on the input electrode during a second time period, and fourth information derived from a fourth charge induced on the output electrode during the second time period, the second time period following the first time period, the second time period being associated with an avalanche of secondary electrons.

30. The neutron detector of claim 29 in which the first time period is prior to full development of an avalanche of secondary electrons in the microchannel plate, and the second time period is after development of the avalanche of secondary electrons in the microchannel plate.

31. The neutron detector of claim 29 in which the data processor is configured to calculate a first ratio between the first charge and the second charge, calculate a first sum of the first and second charges, calculate a second ratio between the third charge and the fourth charge, calculate a second sum of the third and fourth charges, and determine whether a neutron has been detected based on the first ratio, the second ratio, the first sum, and the second sum.

32. The neutron detector of claim 31 in which the data processor is configured to calculate a first parameter value based on dividing the first ratio by the first sum, compare the first parameter value with a first predetermined range of values, calculate a second parameter value based on dividing the second ratio by the second sum, compare the second parameter value with a second predetermined range of values, and determine that a neutron has been detected when the first parameter value is within the first predetermined range of values and the second parameter value is within the second predetermined range of values.

33. The neutron detector of claim 29 in which the glass plate comprises at least one of boron-10 or lithium-6.

34. A neutron detector comprising:
a first electrode;

a second electrode;

a material disposed between the first and second electrodes, the material comprising a neutron sensitive component; and a data processor to determine whether a neutron has been captured in the material based on first information derived from a first charge induced on the first electrode and second information derived from a second charge induced on the second electrode.

35. The neutron detector of claim 34 in which the first and second charges are induced by moving charged reaction products generated in an interaction between an incident radiation and the material.

36. The neutron detector of claim 34 in which the material comprises at least one of an array of microscopic channels, interconnected fibers, or interconnected microspheres.

37. The neutron detector of claim 34 in which the material has a reticulated structure.

38. A neutron detector comprising:

a microchannel plate having an input electrode, an output electrode, and a glass plate comprising microscopic channels; and a data processor to determine whether a neutron has been detected based on comparing the amplitude and width of an induced charge signal detected from the output electrode with stored values, in which the stored values include a first set of values representing a distribution of pulse amplitude and pulse width values associated with neutron events, and a second set of values representing a distribution of pulse amplitude and pulse width values associated with gamma ray events.

* * * * *

UNITED STATES PATENT AND TRADEMARK OFFICE
CERTIFICATE OF CORRECTION

PATENT NO. : 8,445,861 B2
APPLICATION NO. : 13/016876
DATED : May 21, 2013
INVENTOR(S) : W. Bruce Feller and Paul L. White It is certified that error appears in the above-identified patent and that said Letters Patent is hereby corrected as shown below:

In the specification

Col. 1, after line 10, please include the following paragraph:

-- STATEMENT REGARDING FEDERALLY SPONSORED RESEARCH OR DEVELOPMENT     This invention was made with government support under Department of Energy contract DE-SC0009657. The government has certain rights in the invention. --

Signed and Sealed this
Fifth Day of April, 2016

Michelle K. Lee
*Director of the United States Patent and Trademark Office*